United States Patent [19]

Kimura

[11] Patent Number: 4,832,311
[45] Date of Patent: May 23, 1989

[54] VALVE APPARATUS

[75] Inventor: Keiichi Kimura, Yao, Japan

[73] Assignee: Kimura Kohki Kabushiki Kaisha, Yao, Japan

[21] Appl. No.: 264,657

[22] Filed: Oct. 31, 1988

[30] Foreign Application Priority Data

May 20, 1988 [JP] Japan ................. 63-124785

[51] Int. Cl.⁴ .................... F16K 31/04; F16K 1/50
[52] U.S. Cl. .................... 251/118; 251/266; 251/129.11
[58] Field of Search ............. 251/129.11, 266, 267, 251/118

[56] References Cited

U.S. PATENT DOCUMENTS 4,452,423 6/1984 Beblavi et al. ............ 251/129.11 X
4,494,731 1/1985 Spils .................... 251/266 X

FOREIGN PATENT DOCUMENTS 866155 7/1941 France .................. 251/266

Primary Examiner—Arnold Rosenthal
Attorney, Agent, or Firm—Edwin E. Greigg

[57] ABSTRACT

A valve apparatus comprising a valve housing defining a valve bore and a valve chamber through which an inflow pipe and an outflow pipe communicate at right angles with each other. A valve stem is disposed in the valve chamber to be axially reciprocable. The valve stem carries an elastic packing fitted on a head portion of the valve stem, the elastic packing being movable into and out of pressure contact with a valve seat defined at a connection between the valve bore and the valve chamber. A support plate is mounted at an inlet of the valve bore, which support plate defines flow-through openings and a non-circular support bore. The valve stem includes a forward portion having a sectional shape fitting with the non-circular support bore and extending into the non-circular support bore.

8 Claims, 2 Drawing Sheets

Fig.1
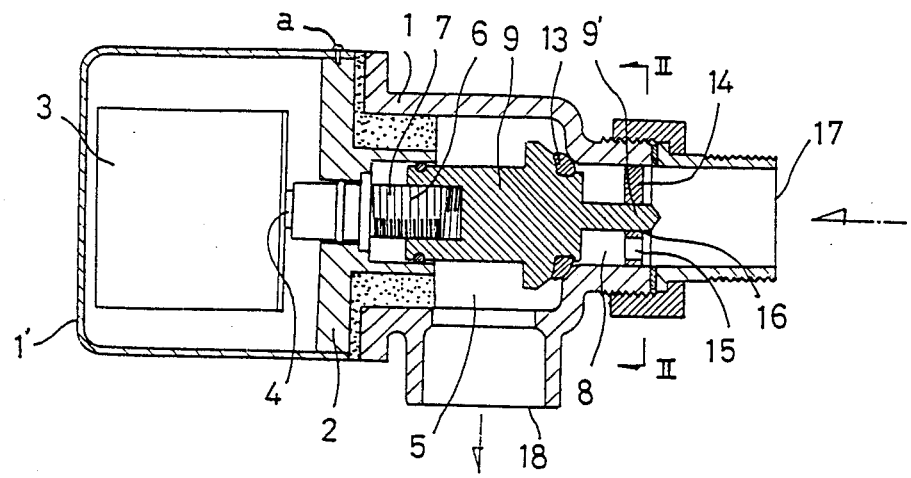
Fig.2
Fig.3
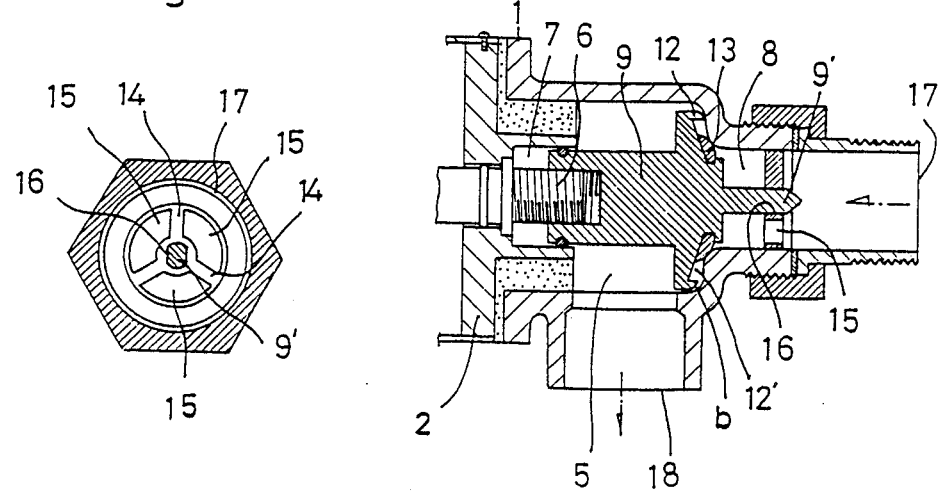

VALVE APPARATUS

BACKGROUND OF THE INVENTION (1) Field of the Invention

The present invention relates to a valve apparatus for use in a proportional control mechanism extensively used in air-conditioning and other systems for controlling cold or hot water. More particularly, the invention relates to a valve apparatus suited primarily to a proportional electric two-way valve, which prevents vibrations of a valve closing member, suppresses turbulence occurring when controlling water, and prevents noise and vibrational and other abnormal sounds occurring with turbulent flows, thereby controlling water very quietly.

(2) Description of the Prior Art

With the spread of various types of air-conditioning system and the remarkable improvement in their performance achieved in recent years, there has been a strong demand for a function to control room temperatures automatically and reliably.

Generally, opening and closing of a valve apparatus have been used as means for stopping and allowing water flows through piping in a cold/hot water supply mechanism for room temperature control.

Most of the ordinary air-conditioning systems employ a valve mechanism which is electrically controlled to stop and allow water flows through the piping. When the valve closing member of the valve mechanism is closed, water flows are stopped suddenly thereby entailing what is known as water hammering to increase the water pressure suddenly. As a result, the water flows become turbulent in the valve bore and valve chamber of the valve mechanism, and the turbulent flows produce abnormal sounds such as frictional noise, impact noise and vibrational noise which propagate as resonances from the valve into the room.

Quiet environment is required for rooms whose temperature is controlled by the proportional control system, such as hospital wards, laboratories and hotels at nighttime. It has been an important subject matter imposed on the industry to provide a drastic solution to the problem of such abnormal sounds however slight they may be.

SUMMARY OF THE INVENTION

A primary object of the present invention is to solve a long-pending problem of sideways wobbles of the valve closing member occurring during a valve operation, and minimize the abnormal sounds produced when controlling water flows through piping, thereby to provide a valve apparatus for use in a proportional control system, which is quiet and realizes an optimal room temperature at all times.

In order to achieve the above object, a valve apparatus according to the present invention comprises a valve housing defining a valve bore and a valve chamber through which an inflow pipe and an outflow pipe defining a passage of a fluid such as water communicate at right angles with each other, and a valve stem axially reciprocable and carrying an elastic packing fitted on a head portion of the valve stem, the elastic packing being movable into and out of pressure contact with a valve seat defined at a connection between the valve bore and the valve chamber, wherein the valve bore includes a support plate mounted at an inlet thereof and defining flow-through openings and a non-circular support bore, the valve stem including a forward portion having a sectional shape fitting with the non-circular support bore and extending into the non-circular support bore.

In the above construction, the valve stem is moved back and forth or up and down with rotations in opposite directions under proportional control based on temperatures. The elastic packing mounted on the head portion of the valve stem is pressed upon the valve seat defined on an inside wall at the connection between the valve bore and the valve chamber to stop water flows, and is retracted from the valve seat to allow the water flows. The valve stem defines a forward pin portion having a non-circular sectional shape inserted into and supported by the support bore. The valve stem, therefore, does not wobble sideways when moving backward and forward or up and down even if sideways forces due to variations in the water pressure act on the valve stem.

As will be apparent from the foregoing description, the present invention produces the following effects:

(1) The valve stem does not rotate or wobble sideways when controlling water flows since the forward end of the stem having a non-circular section is supported in the support bore defined in the support plate. This feature allows a smooth valve opening and closing operation.

(2) The elastic packing provided between the valve stem or valve closing member and the valve seat in the valve chamber is effective to ease contacting impacts between the valve stem or valve closing member and the valve seat. The apparatus is thus protected from wear and damage to have good durability. This construction also allows a valve opening and closing operation to be effected with nicety. Furthermore, since vibrations of the valve stem or valve closing member are suppressed at a valve closing time, there occurs no resonance due to such vibrations.

In a preferred embodiment of the invention, as shown in FIG. 3, the head portion of the valve stem 9 has an enlarged conical shape and defines a sound insulating and turbulence suppressing projection 12 approximately in form of a hat brim around an outer periphery of the head portion.

In this embodiment, the elastic packing 13 mounted on the head portion of the valve closing member 11, by means of its elasticity, eases the contact between the valve stem 9 and the valve seat defined on the inside wall of the valve chamber 5, and promotes tight sealing therebetween and absorbs vibrations of the valve stem 9 when the valve is closed. The turbulence suppressing projection 12 defined approximately in form of a hat brim on the head portion temporarily blocks water flows having seeped through a gap between the packing 13 and the valve seat and entering a recessed space 12' formed between the projection 12 and the inside wall of the valve chamber 5. The water flows, with a reduced pressure, enter the valve chamber 5 through a narrow gap b between the projection or ridge 12 and the inside wall of the valve chamber 5 with little turbulence. Then the water flows into the outflow pipe 18 in a turbulence-free state, thereby preventing noise due to turbulence.

This embodiment including the space defined approximately in the form of a hat brim between the projection around the outer periphery of the valve stem and the inside wall of the valve chamber, thus produces the effect of insulating noise in the valve chamber and suppressing turbulence of the water flowing through the valve chamber.

In another embodiment of the invention, as shown in FIG. 4, the valve stem 9 defines several peripheral grooves 20 for guiding water flows.

In this embodiment, the grooves 20 defined peripherally of the valve stem 9 act as water flow guides, and water adjacent the outer periphery of the valve stem 9 flows along the grooves 20, whereby the water flows are straightened to be free of turbulence in the valve chamber 5 compared with the case of flowing through hollow parts of the valve chamber 5.

This embodiment thus produces the effect of straightening the water flows in a natural way by means of the grooves defined peripherally of the valve stem. Since the resulting water flows are free from turbulence, there occurs no noise or vibrational sound due to turbulence.

In a further embodiment of the invention, as shown in FIG. 5, the valve stem 9 carries a valve closing member 11 mounted thereon through a resilient device 10 such as a coil spring.

Since the closing member 11 is mounted on of the valve stem 9 through the resilient device 10, great and sudden vibrations exceeding the absorbing capacity of the packing 13 are absorbed, thereby checking parasitic oscillation.

According to the above embodiment, therefore, the resilient device absorbing great and sudden vibrational changes allows reliable valve operations and extends durability of the rubber packing.

According to a further embodiment of the invention, as shown in FIG. 6, the valve stem 9 and/or the valve closing member 11 is/are formed of hard rubber.

The valve stem 9 and/or valve closing member 11 formed of hard rubber may be pressed upon the valve seat so as to function as an elastic packing. Further, the valve stem 9 and valve closing member 11 formed of rubber, unlike the case of being formed of a metal, are free from resonance.

With this construction, the valve stem or the valve closing member dispenses with the rubber packing and may achieve a tight contact with the valve seat. This embodiment thus produces the effect of allowing a reliable valve operation and producing no noise in the absence of resonance.

Other objects and advantages of the present invention will be apparent from the following description to be had with reference to the drawings.

BRIEF DESCRIPTION OF THE DRAWINGS

The drawings illustrate valve apparatus for use in a proportional electric two-way valve embodying the present invention, in which:

FIG. 1 is a front view in vertical section of a valve apparatus according to one embodiment of the invention, FIG. 2 is a section taken on line II—II of FIG. 1, and FIGS. 3 through 6 are front views in vertical section of valve apparatus according to other embodiments of the invention, respectively.

DETAILED DESCRIPTION OF THE EMBODIMENTS

Figure 4:
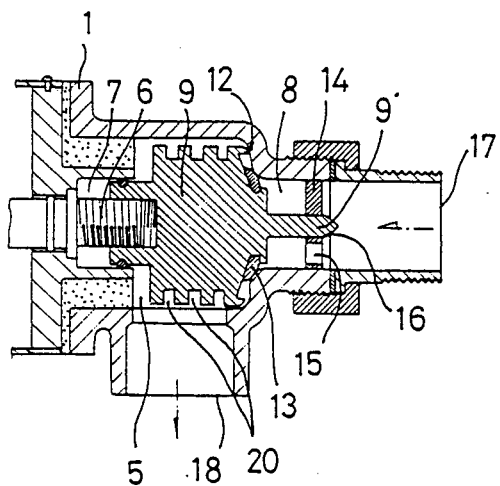

FIGS. 1 and 2 show a first embodiment of the present invention.

Referring to FIG. 1, the valve apparatus shown therein comprises a valve housing 1 including an inflow pipe 17 and an outflow pipe 18 extending at right angles and communicating in an L-shape relationship with each other. The valve housing 1 further includes a valve chamber 5 located between the two pipes 17 and 18. A motor mount 2 is removably attached to the valve housing 1. The mount 2 supports an electric motor 3 which is controlled by an input from a proportional control unit not shown. A motor case 1' enclosing the motor 3 is attached to the mount 2 by screws a. The motor 3 has a shaft 4 which is connected to a rotary shaft 6 rotatably supported by the mount 2. The rotary shaft 6 defines a peripheral thread 7, and a valve stem 9 extending into the valve chamber 5 and defining a threaded bore is screwed onto the rotary shaft 6. The valve stem 9 is axially reciprocable with opposite rotations of the rotary shaft 6. The valve stem 9 includes a pin 9' having an oval section and extending from a forward end thereof through a valve bore 8 defining an inlet communicating with the inflow pipe 17. The pin 9' is inserted into a non-circular support hole 16 defined centrally of a support plate 14 which also defines flow-through openings 15 around the support hole 16. The support hole 16 and the pin 9' have the same sectional shape which is oval as shown in FIG. 2. However, their sectional shape may be triangular or square to prevent the valve stem 9 from rotating on its axis while allowing the stem 9 to reciprocate axially with ease.

The valve stem 9 defines a recess around a head portion thereof into which a rubber or other elastic packing 13 is fitted for pressure contact with a valve seat defined by the valve housing 5.

The packing 13 acts to cushion shocks of contact and maintain a tight contact between the valve seat and the valve stem 9.

FIG. 3 shows a second embodiment of the invention in which the valve stem 9 includes a conical head portion defining a ridge or projection 12 around an outer edge thereof. The ridge 12, the valve seat and the inside wall of the valve housing continuous with the valve seat define a recessed space 12' approximately in the form of the brim of a hat. This space 12' produces a noise insulating effect and suppresses turbulence of water flowing through the space 12'.

FIG. 4 shows a third embodiment in which the valve stem 9 defines peripheral grooves 20 acting as flow guides. Water adjacent the outer periphery of the valve stem 9 flows along the grooves 20, whereby the water flows are straightened to be free of turbulence in the valve chamber 5.

Figure 5:
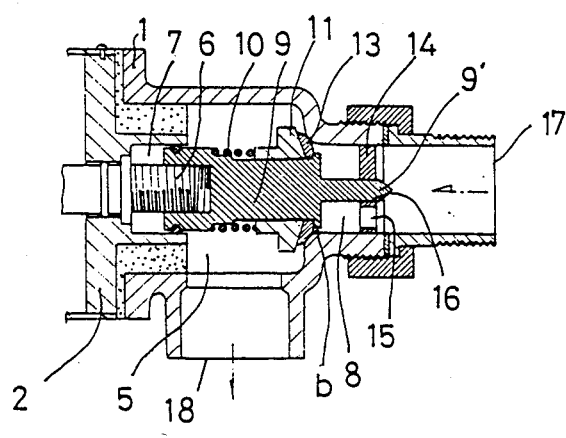

FIG. 5 shows a fourth embodiment in which a tubular valve closing member 11 is slidably mounted peripherally of the valve stem 9. A resilient device such as a coil spring 10 extends between a stepped portion of the valve stem 9 and a rear end of the valve closing member 11 for urging the valve stem 9 outwardly. Thus, vibrations due to momentary variations of water pressure are absorbed and eased by the resilience of coil spring 10.

The coil spring 10 applies a constant pressure to the packing 13 and absorbs vibrations exceeding the absorbing capacity of the packing 13, thereby checking excessive vibrations.

The valve apparatus having the resilient device 10 as shown in FIG. 5 can cope with the water pressure in a position of use or with the mechanism in which the valve apparatus is mounted, thereby performing the valving function in an excellent and reliable manner. This is achieved by selecting the resilient device 10 suited to particular flow conditions.

Figure 6:
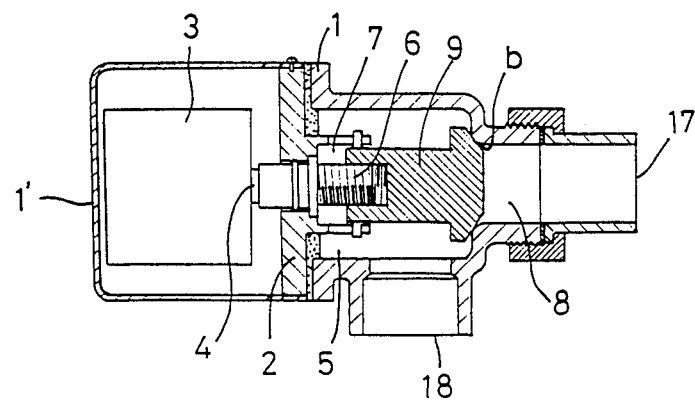

FIG. 6 shows a fifth embodiment which is a valve apparatus of the simplest design with the valve stem 9 and valve closing member 11 of the fourth embodiment integrated and the resilient device 10 dispensed with. The valve stem 9 and valve closing member 11 in this example may entirely be formed of elastic rubber such as hard rubber. Then the rubber packing 13 need not be provided separately, let alone the resilient device 10, since these elements may be integrated into the valve stem and valve closing member combination. The valve stem 9 and/or valve closing member 11 may also define a turbulence suppressing projection 12 and grooves 20 (not shown in FIG. 6) as integral parts thereof. This embodiment thus has an advantage with regard to manufacture and is suited for mass production. The valve stem 9 and valve closing member 11 formed of rubber, unlike the case of being formed of a metal, are free from resonance and hence produce no vibrational noise when controlling water flows.

With the described constructions, the electric motor 3 may be removed together with the rotary shaft 6, valve stem 9 and valve closing member 11 by detaching the mount 2 from the housing 11 and pulling the pin 9' of the valve stem 9 out of the support bore 16. This feature facilitates inspection, cleaning, maintenance, repair and various other operations carried out for the valve interior.

The present invention is not limited to the described embodiments but is applicable to a vertical pipe, a three-way valve, a multiple port valve and other types of valve.

The fluid flowing through the inflow pipe 17 and outflow pipe 18 may be allowed to flow in the reverse direction.

While the several embodiments considered typical have been described hereinbefore, the present invention may be worked in various ways within the scope which includes the essential features of the invention, achieves the object of the invention and produces the effect of the invention.

What is claimed is:

1. A valve apparatus comprising a valve housing (1) defining a valve bore (8) and a valve chamber (5) through which an inflow pipe (17) and an outflow pipe (18) defining a passage of a fluid such as water communicate at right angles with each other, and a valve stem (9) axially reciprocable and carrying an elastic packing (13) fitted on a head portion of the valve stem (9), the elastic packing (13) being movable into and out of pressure contact with a valve seat defined at a connection between the valve bore (8) and the valve chamber (5), wherein said valve bore (8) includes a support plate (14) mounted at an inlet thereof and defining flow-through openings (15) and a non-circular support bore (16), said valve stem (9) including a forward portion (9') having a sectional shape fitting with said non-circular support bore (16) and extending into said non-circular support bore (16).

2. A valve apparatus as claimed in claim 1 wherein said head portion of said valve stem (9) has an enlarged conical shape and defines a turbulence suppressing projection (12) approximately in form of a hat brim around an outer periphery of the head portion.

3. A valve apparatus as claimed in claim 2 wherein said valve stem (9) defines peripheral grooves (20) for guiding and straightening the fluid flowing through said valve chamber (5).

4. A valve apparatus as claimed in claim 2 wherein said valve stem (9) carries a valve closing member (11) mounted thereon through a resilient device (10).

5. A valve apparatus as claimed in claim 2 wherein said valve stem (9) and/or the valve closing member (11) is/are formed of hard rubber.

6. A valve apparatus as claimed in claim 3 wherein said valve stem (9) carries a valve closing member (11) mounted thereon through a resilient device (10).

7. A valve apparatus as claimed in claim 3 wherein said valve stem (9) and/or the valve closing member (11) is/are formed of hard rubber.

8. A valve apparatus as claimed in claim 4 wherein said valve stem (9) and/or the valve closing member (11) is/are formed of hard rubber.

* * * * *